United States Patent
Zhang (10) Patent No.: US 10,346,703 B2
(45) Date of Patent: Jul. 9, 2019

(54) METHOD AND APPARATUS FOR INFORMATION RECOGNITION

(71) Applicant: ALIBABA GROUP HOLDING LIMITED, George Town, Grand Cayman (KY)

(72) Inventor: Yu Zhang, Beijing (CN)

(73) Assignee: ALIBABA GROUP HOLDING LIMITED, Grand Cayman (KY)

(*) Notice: Subject to any disclaimer, the term of this patent is extended or adjusted under 35 U.S.C. 154(b) by 0 days.

(21) Appl. No.: 14/931,575

(22) Filed: Nov. 3, 2015

(65) Prior Publication Data

US 2016/0132739 A1 May 12, 2016

(30) Foreign Application Priority Data

Nov. 6, 2014 (CN) .......................... 2014 1 0638602

(51) Int. Cl.
*G06K 9/00* (2006.01)
*G06K 9/20* (2006.01)

(52) U.S. Cl.
CPC ....... *G06K 9/2081* (2013.01); *G06K 9/00463* (2013.01); *G06K 2209/01* (2013.01)

(58) Field of Classification Search
CPC ............ G06K 9/2081; G06K 9/00463; G06K 2209/01
USPC .................................................. 382/182–189
See application file for complete search history.

(56) References Cited

U.S. PATENT DOCUMENTS

| 5,199,083 | A | 3/1993 | Takeda |
| 5,321,520 | A | 6/1994 | Inga et al. |
| 5,329,382 | A | 7/1994 | Mita |
| 5,428,694 | A | 6/1995 | Betts et al. |
| 5,721,940 | A * | 2/1998 | Luther ................. G06F 17/243 715/200 |
| 6,357,658 | B1 | 3/2002 | Garczynski et al. |
| 6,385,351 | B1 * | 5/2002 | Simske ................ H04N 1/3872 382/282 |
| 7,990,561 | B2 | 8/2011 | Okabe |
| 8,103,099 | B2 | 1/2012 | Andel et al. |
| 8,320,708 | B2 | 11/2012 | Kurzweil et al. |

(Continued)

FOREIGN PATENT DOCUMENTS

| CN | 101149790 A | 3/2008 |
| CN | 101458770 A | 6/2009 |

(Continued)

OTHER PUBLICATIONS

PCT International Search Report and Written Opinion dated Jan. 13, 2016, issued in corresponding International Application No. PCT/US2015/58864 (9 pages).

(Continued)

*Primary Examiner* — Andrew M Moyer
(74) *Attorney, Agent, or Firm* — Finnegan, Henderson, Farabow, Garrett & Dunner, LLP (57) ABSTRACT

A method for information recognition using an Optical Character Recognition (OCR) program includes acquiring an image of an object to be recognized, analyzing a layout of the contents of the image and extracting character area blocks in the image, determining character lines in the character area blocks, and recognizing, by the OCR program, character information of the key character lines in the character area blocks.

27 Claims, 7 Drawing Sheets

(56) References Cited

U.S. PATENT DOCUMENTS

| | | |
|---|---|---|
| 2002/0037097 A1 | 3/2002 | Hoyos et al. |
| 2002/0191847 A1 | 12/2002 | Newman et al. |
| 2004/0202349 A1 | 10/2004 | Erol et al. |
| 2005/0052558 A1 | 3/2005 | Yamazaki et al. |
| 2006/0088214 A1* | 4/2006 | Handley ............ G06K 9/00469 382/176 |
| 2006/0143154 A1* | 6/2006 | Jager ................ G06F 17/30011 |
| 2007/0280534 A1 | 12/2007 | Foss |
| 2008/0233980 A1 | 9/2008 | Englund et al. |
| 2009/0110279 A1* | 4/2009 | Jain .................... G06F 17/243 382/176 |
| 2009/0161991 A1* | 6/2009 | Nestares ............ G06K 9/3208 382/296 |
| 2011/0123115 A1 | 5/2011 | Lee et al. |
| 2012/0170829 A1 | 7/2012 | Jackson et al. |
| 2012/0290601 A1 | 11/2012 | Huang |
| 2013/0204777 A1* | 8/2013 | Irwin, Jr. ................ G06K 9/18 705/39 |
| 2015/0213330 A1* | 7/2015 | Chulinin ............ G06F 17/2863 382/185 |

FOREIGN PATENT DOCUMENTS

| | | |
|---|---|---|
| CN | 102298696 A | 12/2011 |
| CN | 103995904 A | 8/2014 |
| CN | 103577818 A | 2/2017 |
| WO | WO 2016/073503 A1 | 5/2016 |

OTHER PUBLICATIONS

First Chinese Office Action issued in Chinese Application No. 201410638602.X, dated Jun. 1, 2018 (15 pages).

First Chinese Search Report for counterpart Chinese Patent Application No. 201410638602.X, dated May 17, 2018 (2 pages).

* cited by examiner

General Printed Invoice
Beijing Municipal Office of State Administration of Taxation Invoice form Invoice Code: 111001478055
Invoice No.: 05786254
Password:
Payee: XX Technology Co., Ltd.
Tax No.: 11010856489652
Issuance Date: 2014-9-2
Printer No.: 2258   Cashier: 02
Payer Name: Personal

| Item | Unit Price | Quantity | Sum |
|---|---|---|---|
| Computer case | 299.00 | 1 | 299.00 |
| | 1299.00 | 1 | 1299.00 |
| CPU | 998.00 | 1 | 998.00 |
| Motherboard | | | |
| Display card | 1355.00 | 2 | 2710.00 |
| Keyboard | 350.00 | 2 | 700.00 |
| Display | 1150.00 | 1 | 1150.00 |

XX Technology Co., Ltd.
11010856489652
Special Stamp for Invoice

Total in numbers: 7156.00
Total in words: Seventy-One Hundred Fifty-six Yuan

METHOD AND APPARATUS FOR INFORMATION RECOGNITION

CROSS-REFERENCE TO RELATED APPLICATION

This application is based upon and claims priority to Chinese Patent Application No. 201410638602.X, filed Nov. 6, 2014, the entire contents of which are incorporated herein by reference.

TECHNICAL FIELD

The present application relates to the technical field of computer technologies, in particular, to a method and an apparatus for information recognition.

BACKGROUND

Optical Character Recognition (OCR) technology is widely applied to automatic recognition of character information. It is desired that the technology can recognize character information from images and automatically enter recognized character information into users' databases. Specifically, the users may acquire images of objects to be recognized by photographing or scanning After the character information in the images is recognized through the OCR technology, the character information may be automatically entered into databases.

SUMMARY

The present disclosure provides a method for information recognition using an Optical Character Recognition (OCR) program. The method includes acquiring an image of an object to be recognized, analyzing a layout of contents of the image and extracting character area blocks in the image, determining character lines in the character area blocks, and recognizing, by the OCR program, character information of the key character lines in the character area blocks.

Consistent with some embodiments, this disclosure provides an apparatus for information recognition. The apparatus may include an acquisition unit configured to acquire an image of an object to be recognized, an extraction unit configured to analyze a layout of contents of the image and extract character area blocks in the image, and a recognition unit configured to use Optical Character Recognition (OCR) to recognize character information of key character lines in the character area blocks.

Additional objects and advantages of the disclosed embodiments will be set forth in part in the following description, and in part will be apparent from the description, or may be learned by practice of the embodiments. The objects and advantages of the disclosed embodiments may be realized and attained by the elements and combinations set forth in the claims.

It is to be understood that both the foregoing general description and the following detailed description are exemplary and explanatory only, and are not restrictive of the disclosed embodiments, as claimed.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DESCRIPTION OF THE EMBODIMENTS

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

Figure 1:
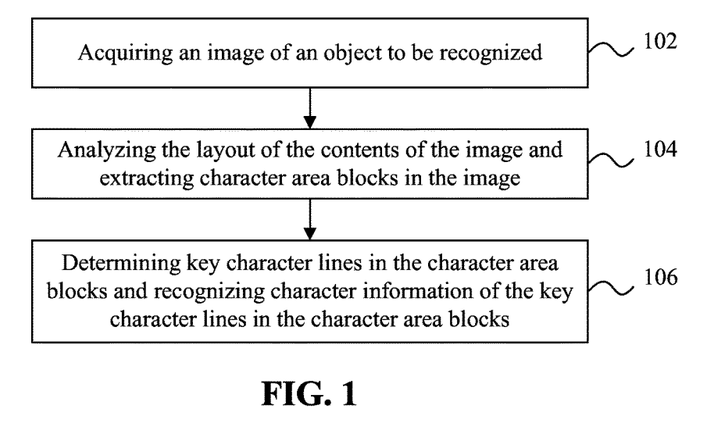
FIG. 1 shows a flowchart of a method for information recognition according to an exemplary embodiment of the present application.

In order to further describe the present application, the following embodiments are provided:

FIG. 1 shows a flowchart of a method for information recognition according to an exemplary embodiment of the present application. The method may comprise the following steps.

Step 102: acquiring an image of an object to be recognized.

In one exemplary embodiment, the image of the object to be recognized can be acquired by photographing the object to be recognized. For example, a user can use a camera or a mobile device (such as a mobile phone or a tablet device with a camera) to photograph the object. As another exemplary embodiment, the image of the object to be recognized can be acquired by scanning the object to be recognized, for example, by a scanner.

Step 104: analyzing the layout of the contents of the image and extracting character area blocks in the image.

In one exemplary embodiment, the layout of the image can be analyzed and the character area blocks in the image can be determined Attributes such as the character arrangement orientation and the character type of each character area block can also be obtained. Different character area blocks can also be ranked to facilitate the sequential processing of each character area block.

One skilled in the art should understand that, in addition to the character area blocks that need to be processed in the present application, other types of area blocks, such as graphic images and tables, can also be extracted by analyzing the layout.

Step 106: determining key character lines in the character area blocks and recognizing character information of the key character lines in the character area blocks.

The object to be recognized may contain a significant amount of information, and the user may be interested in only the character information in some key character lines. Since the amount of the character information contained in the object to be recognized is comparatively large, if the whole object is OCRed, the processing efficiency may be reduced because of the amount of the information. The performance may not satisfy the user's demands.

In an exemplary embodiment, a preset object or program can execute any operation on the information recognized in the key character lines, for example, storing the information, entering the information in a preset table, or performing searches on the information. The operations and the programs used can be determined according to the actual demands of the user. The key character lines can be determined by a few methods, as detailed below.

According to the above-mentioned embodiment, by selecting the key character lines in which the user is interested and recognizing and recording the information only in the key character lines, more precise OCR recognition operations can be realized with respect to the information in the key character lines within a short time. Other character information may not need to be recognized. Thus, the recognition efficiency and accuracy can be improved.

Figure 2:
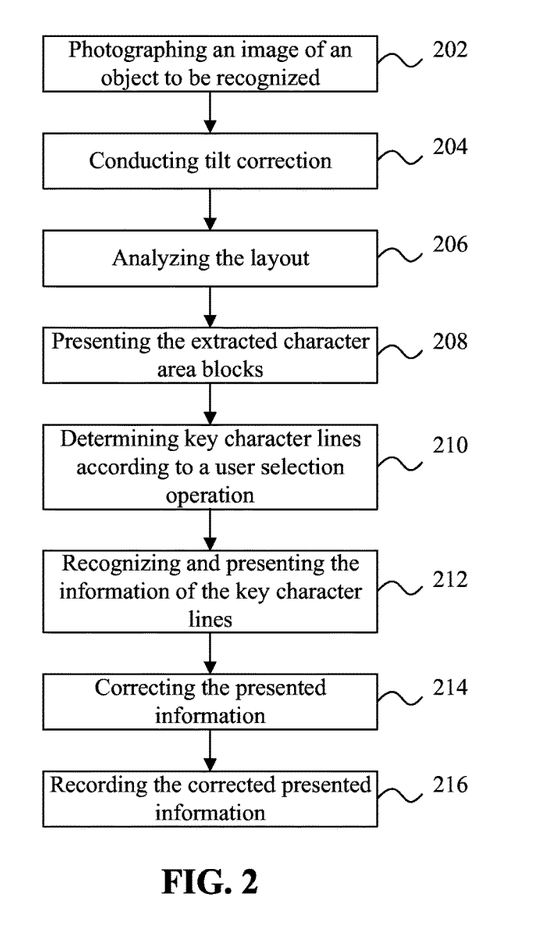
FIG. 2 shows a flowchart of another method for information recognition according to another exemplary embodiment of the present application.

FIG. 2 is a flowchart of another method for information recognition according to an exemplary embodiment of the present application. As shown in FIG. 2, the method can comprise the following steps.

Step 202: photographing an image of an object to be recognized.

In one exemplary embodiment, the object to be recognized can be an object of any form, such as a signboard, a packaging box, or a manuscript, as long as it contains character information that can be recognized through the OCR technology. As an exemplary embodiment, the technical solution of the present application will be described in detail below by taking a "receipt" as an example, which can be a printed receipt/invoice.

Step 204: performing tilt correction to display contents in the image.

Figure 3:
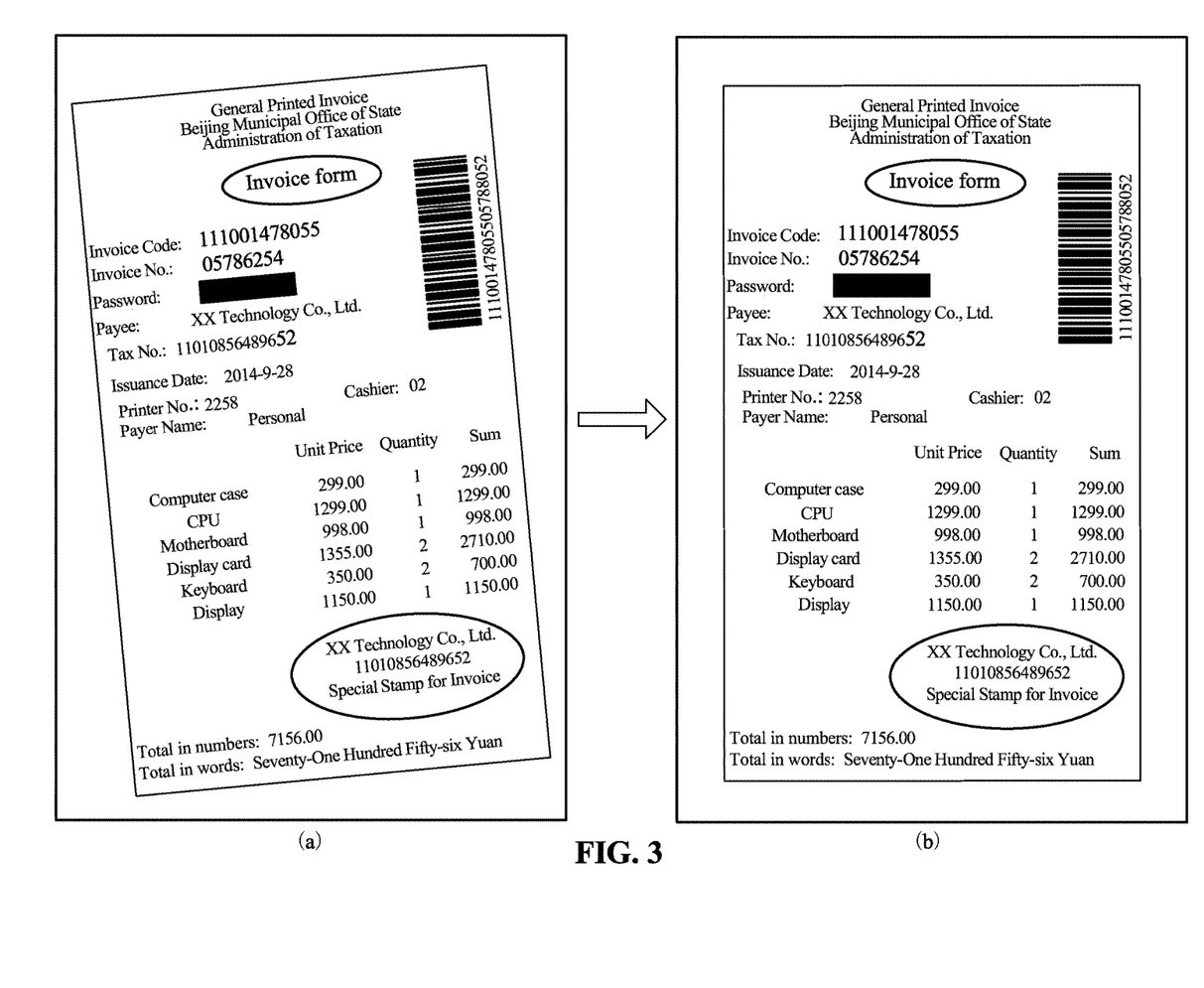
FIGS. 3-6 show schematic diagrams of interface display contents according to an exemplary embodiment of the present application.

In the exemplary embodiment, due to reasons such as the photographing angle, the character lines in the image may not be in parallel with (or be perpendicular to) the edges of the image. As shown in FIG. 3, when the object to be recognized is the printed invoice, the image obtained through photographing may be as shown in FIG. 3(*a*). The tilted image may create difficulties for the subsequent processing, such as layout analysis and single-line segmentation. A tilt correction process can be performed to obtain an upright image. After the tilt correction, the obtained character lines in the image are in parallel with (or perpendicular to) the edges of the image. For example, the image shown in FIG. 3(*a*) is corrected to get the image shown in FIG. 3(*b*).

In this embodiment, the tilt angle of the character lines in the image can be detected by using one of the following methods: a method based on Hough Transform, a method based on crossing linearity, a method based on projection, a method based on Fourier Transform, and a K nearest neighbor clustering method. One skilled in the art should understand that the detection of the tilt angle can be realized by other suitable methods, which should not be limited to the ones listed above.

Step 206: analyzing the layout of the image of the object to be recognized.

In the exemplary embodiment, the image can be divided into a plurality of area blocks through layout analysis, attributes (such as horizontally arranged characters, vertically arranged characters, graphic images, and tables) of each area block and area character types (such as simplified Chinese, traditional Chinese, and English) can be recorded, and the sequence of different area blocks can be marked to facilitate subsequent processing and recognition operations.

Figure 4:
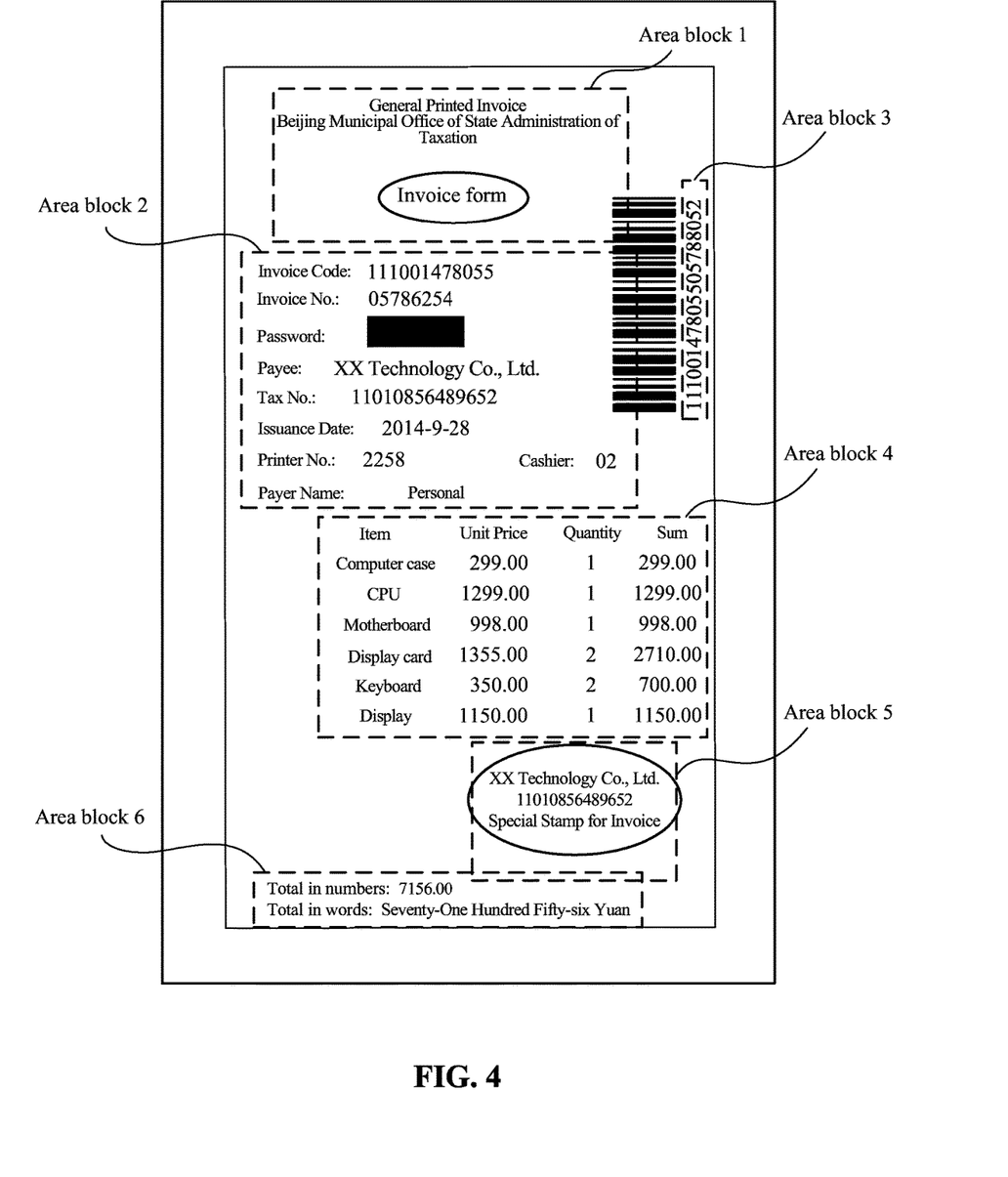

The types of area blocks can include character area blocks, image area blocks, table area blocks, etc. When the user is only interested in the character area blocks, the user can choose to recognize only the character area blocks. For example, FIG. 4 illustrates a layout analysis result of an exemplary embodiment and illustrates a total of six character area blocks, such as an area block 1 and an area block 2.

Step 208: presenting the extracted character area blocks based on the result of the layout analysis. Specifically, for example, each character area block is marked and presented through dashed line frames, marking characters, etc., as shown in FIG. 4.

Step 210: determining key character lines in the character area blocks according to a user selection operation.

In the exemplary embodiment, for the key character lines that need to be recognized in step 106 shown in FIG. 1, the key character lines can be manually selected by users to satisfy the actual needs of different users or the same user under different situations.

Figure 5:
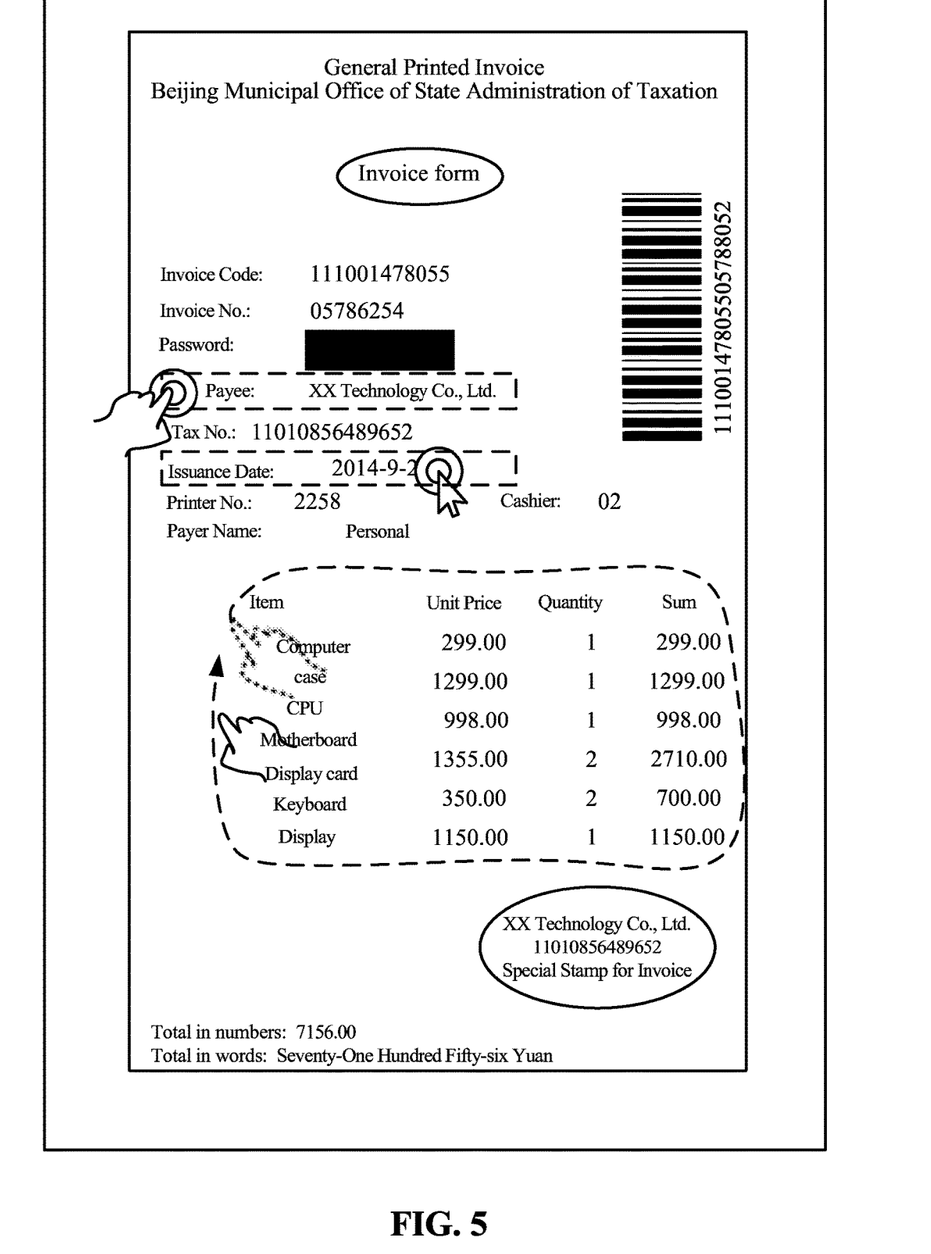

In this embodiment, the user can realize the selection operation through various methods. For example, as an exemplary embodiment, the selection operation can be a click operation, and the character lines corresponding to click positions can be used as the key character lines by acquiring the click positions corresponding to the click operation. For example, as shown in FIG. 5, the device that is used for conducting the OCR recognition operation on the image may have a touch screen (for example, a smart phone with a touch screen). The user can directly click on the touch screen with a finger to select the key character lines. Supposing that the click position is located at the position "Payee" shown in FIG. 5, "Payee: XX Technology Co., Ltd." corresponding to the click position can be used as the key character line. In some other embodiments, the above-mentioned device can be a computer or a mobile device that supports the OTG (On-The-Go) technology. The user can use a cursor on the device through a mouse (or other peripheral devices) and conducts the click operation on the position of the cursor on the screen of the device by pressing a key on the mouse. For example, if the click position is the position "2014-9-28" shown in FIG. 5, "Issuance Date: 2014-9-28" corresponding to the click position can be used as the key character line.

As another exemplary embodiment, the selection operation can also be a frame selection operation, and the character lines within a frame selection area can be used as the key character lines by acquiring the frame selection area corresponding to the frame selection operation. For example, as shown in FIG. 5, the user can use a figure (if the device supports the touch display operation) or a mouse cursor (not shown in FIG. 5) to slide on the image, and corresponding sliding trajectories form a closed graphic (such as a rounded rectangle corresponding to a dashed line frame at the bottom of FIG. 5) on the image. The character lines corresponding to the closed graphic can be used as the key character lines.

Step 212: recognizing and presenting the information of the key character lines.

In the exemplary embodiment, the information of the key character lines is recognized. The recognizing step may mainly include operation steps such as single-character segmentation and character recognition. Since adhesion between or within characters may impact the segmentation accuracy, generally, character recognition may not immediately follow single-character segmentation. With respect to single-character segmentation, one simple way is to space the two adjacent characters by using vertical projection. However, since the spacing between the characters in invoices is generally relatively small, it may be difficult to distinguish single characters with relatively good results by using vertical projection. In some embodiments, connected domains of the lines can be first extracted, the connected domains at vertical positions are merged, and then the final recognition result is obtained by continuously trying left and right segmentation positions and collecting recognition results.

Figure 6:
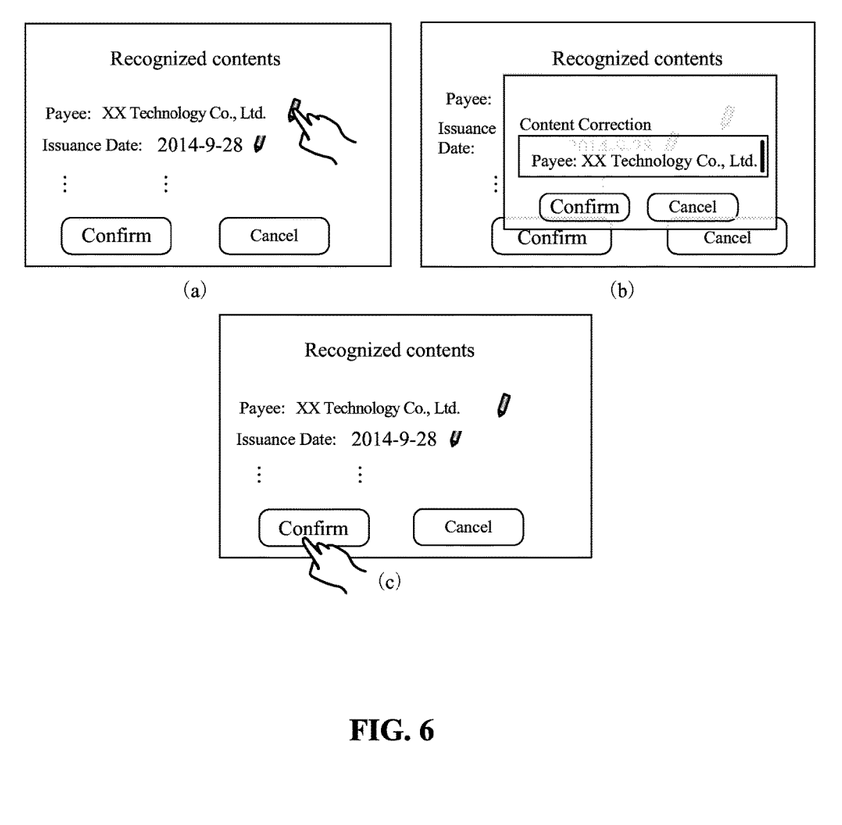

In the exemplary embodiment, the information of the key character lines automatically recognized by the device through the OCR technology can be presented to the user in the form of a "Recognized Contents" window by using a method shown in FIG. 6(*a*). On the one hand, the user can be informed about information "completed", and on the other hand, since errors or mistakes may occur during the OCR recognition operation, the user can check and correct the automatic recognition result of the device.

Step 214: correcting the presented information of the key character lines according to a user correction operation.

In the exemplary embodiment, by taking FIG. 6 as an example, supposing that the information of the key character lines presented by the device includes "Payee: XX抖科有 限公司" (XX 抖技 (incorrect writing for "Technology") Co., Ltd., "Issuance Date: 2014-9-28," etc., as shown in FIG. 6(*a*), when the user considers that the information is correct, the user can directly push a "Confirm" button, and thus the device records the presented information of the key character lines; or when the user considers that the information is incorrect, for example, when the user finds that the device incorrectly recognizes "抖科" as "抖技", the user can make a correction thereto.

As an exemplary embodiment, a "pencil" icon shown in FIG. 6(*a*) can be generated at the end of the information of each key character line to indicate to the user that "Edit" may be performed on the corresponding information. For example, when the user clicks the "pencil" icon at the end of "XX 抖技有限公司" (XX 抖技 (incorrect writing for "Technology") Co., Ltd.), a "Content Correction" window shown in FIG. 6(*b*) is displayed, and thus the user can correct "Payee: XX 抖技有限公司" (XX 抖技 (incorrect writing for "Technology") Co., Ltd.) to "Payee: XX 抖科有限公司" (XX Technology Co., Ltd.).

Step 216: recording the corrected presented information.

In the exemplary embodiment, after the user corrects the presented information, a "Recognized contents" window is shown as depicted in FIG. 6(*c*) after correction is obtained, and at this moment, the user may further correct other presented information; or when the user considers that all presented contents are correct, the user can select a "Confirm" button, and thus the device records the corrected presented contents (which should be understood as including the character line "Payee: (XX Technology Co., Ltd.)," which is actually corrected, and a character line such as "Issuance Date: 2014-9-28," which is not corrected).

In the exemplary embodiment, the device can record the corrections made by the user; thus, similar recognition mistakes can be prevented from occurring in subsequent recognition processes and the accuracy of recognition can be improved.

In the above-mentioned embodiment, based on the simple interaction assistance from the user, the device only needs to recognize and record the key character lines in the image, and thus the OCR recognition efficiency is improved by reducing the amount of information to be recognized. At the same time, since the amount of the information that needs to be recognized is comparatively small, the device can adopt a more precise recognition technology within a short period of time to improve the accuracy of recognition.

Figure 7:
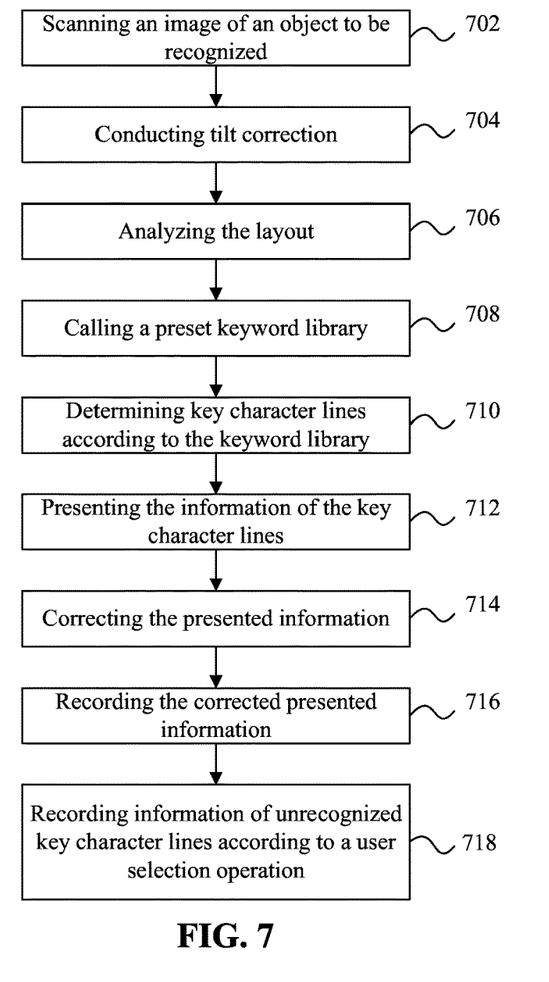
FIG. 7 shows a flowchart of another method for information recognition according to another exemplary embodiment of the present application.

FIG. 7 is a flowchart of another method for information recognition according to an exemplary embodiment of the present application. As shown in FIG. 7, the method can comprise the following steps:

Step 702: obtaining an image of an object to be recognized through scanning

Step 704: conducting tilt correction to the image obtained through scanning

Step 706: analyzing the layout of the image of the object to be recognized to obtain character area blocks shown in FIG. 4.

Step 708: calling a preset keyword library.

In the exemplary embodiment, the user can install and run a corresponding APP (application) and the installation document of the APP may contain the keyword library. After the APP is run, the APP may download the keyword library from a server. Alternatively, the user can establish a keyword library according to the actual demands thereof, or edit the existing keyword library.

Step 710: determining key character lines according to the keyword library. For example, the character lines containing keywords in the keyword library can be determined as the key character lines.

In the exemplary embodiment, for the key character lines that need to be recognized in step 106 shown in FIG. 1, which is different from step 210 shown in FIG. 2 where the user manually determines the key character lines, the key character lines can be automatically selected by a computer according to the pre-established keyword library. In this way, the amount of user operation can be reduced and the automatic level and operation efficiency of selecting the key character lines are improved.

In the exemplary embodiment, supposing that the user needs to recognize the printed invoice to realize a "bookkeeping" function, information in which the user is interested usually includes transaction party names, time and sums, and thus corresponding keywords can be "unit," "date," "total," etc.

Therefore, based on the keyword library, the device can use "Payee: XX Technology Co. Ltd.," "Issuance Date: 2014-9-28," "Total in numbers: 7156.00," "Total in words: Seven thousand one hundred fifty six and 00/100", etc., as the key character lines.

Step 712: presenting the information of the key character lines.

Figure 8:
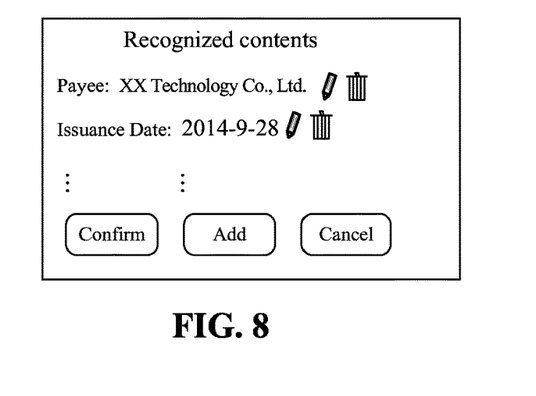
FIG. 8 shows a schematic diagram of interface display contents according to an exemplary embodiment of the present application.

In the exemplary embodiment, the information of the recognized key character lines can be presented on the screen of the device through a method shown in FIG. 8.

Step 714: correcting the presented information according to a user operation.

In this embodiment, the correction to the presented information can be understood as follows:

On the one hand, correctly recognized key character lines and/or common character lines incorrectly recognized as the key character lines are determined For example, as shown in FIG. 8, if the user considers that "Payee: XX 抖技有限公司" (XX 抖技 (incorrect writing for "Technology") Co., Ltd.), "Issuance Date: 2014-9-28," and the like, which are automatically recognized by the computer, are key character lines in which the user is interested, the user can directly click the "Confirm" button; and if the user considers that a certain character line is a character line in which the user is not interested and which is recognized as a key character line by the computer, for example, "Issuance Date: 2014-9-28," the user can click a "trash can" icon displayed at the end of the character line to delete the contents of the character line from a current interface and record the character line as a regular character line.

On the other hand, similar to step 214 shown in FIG. 2 and the contents shown in FIG. 6, the user can edit the information in the "Recognized contents" window in FIG. 8. For example, the user can correct "Payee: XX 抖技有限公司" (XX 抖技 (incorrect writing for "Technology") Co., Ltd.) to "Payee: XX 抖技有限公司" (XX Technology Co., Ltd.) by clicking the "pencil" icon at the end of "Payee: XX 抖技有限公司" (XX 抖技 (incorrect writing for "Technology") Co., Ltd.).

Step 716: recording the corrected presented information.

In the exemplary embodiment, after the user completes the correction to the key character lines presented in FIG. 8, the device can record the information of the corresponding key character lines by clicking the "Confirm" button.

Step 718: recording information of unrecognized key character lines according to a user selection operation.

In the exemplary embodiment, if there are key character lines that contain information in which the user is interested but are not automatically recognized by the device, the user can assist in recognizing the key character lines based on a simple user interaction by clicking an "Add" button, as shown in FIG. 8, in combination with step 210 in FIG. 2.

In the above-mentioned embodiment, by presetting the keyword library, the device can automatically recognize the key character lines. The device only needs to recognize and record the key character lines in the image, and thus the OCR recognition efficiency is improved by reducing the amount of information that needs to be recognized. At the same time, since the amount of information that needs to be recognized is comparatively small, the device can adopt a more precise recognition technology within a short time to improve the accuracy of recognition.

In addition, by combining the preset keyword library and the simple interaction assistance of the user, for example, by first selecting possible key character lines through the keyword library and then making a confirmation, correction, or addition based on the user operation, the recognition accuracy of the key character lines can be improved.

Figure 9:
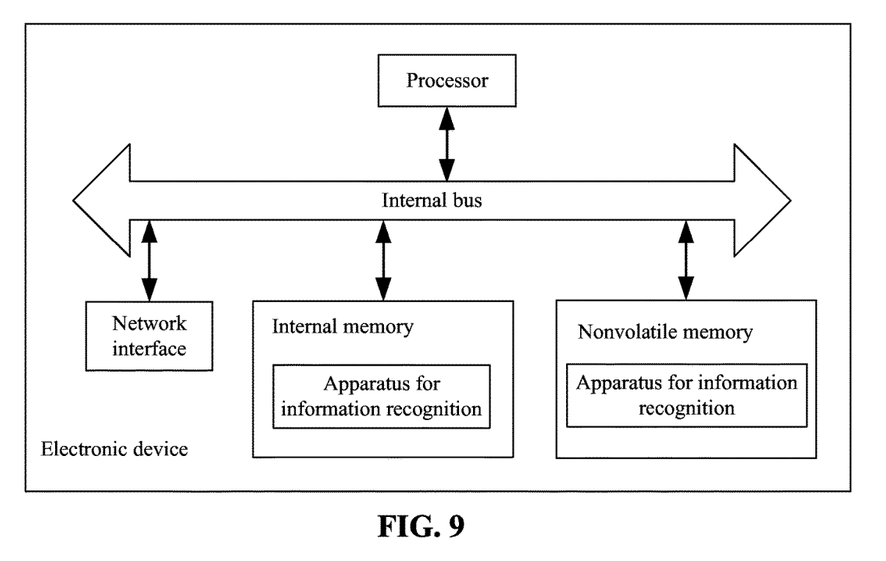
FIG. 9 shows a structural schematic diagram of an electronic device according to an exemplary embodiment of the present application.

FIG. 9 is a structural schematic diagram of an electronic device according to an exemplary embodiment of the present application. At the level of hardware, the electronic device comprises a processor, an internal bus, a network interface, an internal memory, and a nonvolatile memory, and may further comprise other hardware that is needed for the services, as discussed above. The processor reads a corresponding computer program from the nonvolatile memory to the internal memory and runs the computer program, and thus an apparatus for information recognition is formed at the logic level. In addition to software implementation methods, the present application does not exclude other implementation methods, such as a method through a logic device or a combination of software and hardware. In other words, subjects for executing the following process flow are not limited to each logic unit, and can also be hardware or logic devices.

Figure 10:
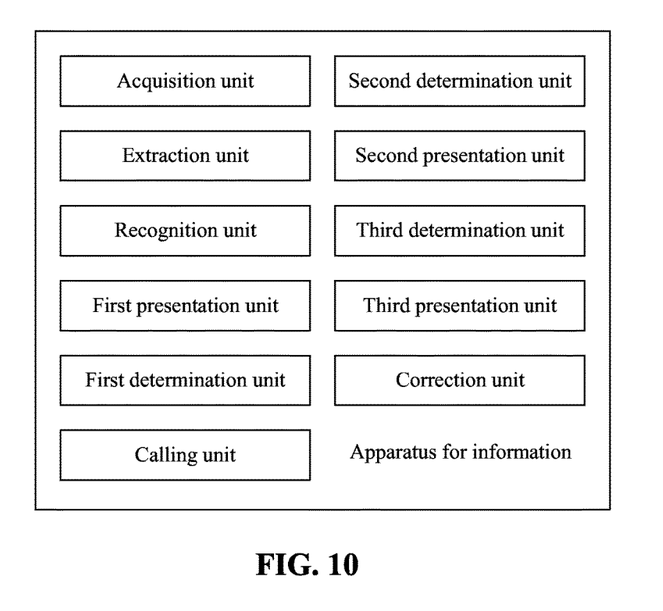
FIG. 10 shows a block diagram of an apparatus for information recognition according to an exemplary embodiment of the present application.

Referring to FIG. 10, in one embodiment, an apparatus for information recognition can comprise an acquisition unit, an extraction unit, and a recognition unit. The acquisition unit is configured to acquire an image of an object to be recognized.

The extraction unit is configured to extract character area blocks in the image by analyzing the layout of the contents of the image. The recognition unit is configured to recognize character information of key character lines in the character area blocks.

Optionally, the apparatus for information recognition further comprises: a first presentation unit configured to present the extracted character area blocks, and a first determination unit configured to determine the key character lines according to a detected first selection operation conducted by a user in the character area blocks. Optionally, the determination unit is configured to, when the first selection operation is a click operation, acquire click positions corresponding to the click operation and use character lines corresponding to the click positions as the key character lines; or when the first selection operation is a frame selection operation, acquire a frame selection area corresponding to the frame selection operation and use character lines in the frame selection area as the key character lines.

Optionally, the apparatus for information recognition further comprises a calling unit configured to call a preset keyword library, and a second determination unit configured to determine character lines containing keywords in the keyword library as the key character lines.

Optionally, the apparatus for information recognition further comprises a second presentation unit configured to present the recognized key character lines, and a third determination unit configured to determine correctly recognized key character lines and/or common character lines incorrectly recognized as the key character lines according to a detected second selection operation conducted by the user to the presented key character lines.

Optionally, the apparatus for information recognition further comprises a third presentation unit configured to present character information of the recognized key character lines, and a correction unit configured to detect a correction operation conducted by the user to the presented character information and record the corrected information as the character information of the key character lines.

Optionally, the object to be recognized includes an invoice.

In the present application, by further determining the key character lines in the character area blocks and recognizing and recording the information of the key character lines only, the recognition efficiency of the object to be recognized is greatly improved.

A person having ordinary skill in the art should understand that embodiments of the present application may be provided as method, system, or computer program products. The invention may be in the form of a hardware embodiment, a software embodiment, or a combined hardware and software embodiment. Moreover, the invention may be in the form of a computer program product implemented on a non-transitory computer-readable memory medium (including, but not limited to, disk memory, CD-ROM, and optical memory) comprising computer-executable program codes.

The present application is described with reference to the flowchart and/or block diagram of the method, device (system), and computer program product according to the embodiments of the present application. It should be understood that the flow and/or block in the flowchart and/or block diagram, and the combination of a flow and/or block in the flowchart and/or block diagram can be implemented by computer program commands Such computer program commands can be provided to a processor of a general computer, a dedicated computer, an embedded processing unit, or other programmable data processing devices to produce a machine, so that the commands executed by the processor of the computer or the other programmable data processing devices produce an apparatus used for implementing functions specified in one or more flows in the flowchart and/or one or more blocks in the block diagram.

These computer program commands may also be stored in a non-transitory computer-readable memory capable of guiding a computer or other programmable data processing devices to function in a specified mode. The commands stored in the computer-readable memory generate a product with the commands for implementing the functions specified in one or more flows in the flowchart and/or one or more blocks in the block diagram.

These computer program commands may also be loaded in a computer or other programmable data processing devices. The commands, when executed on the computer or other programmable data processing devices, provide the steps for implementing the functions specified in one or more flows in the flowchart and/or one or more blocks in the block diagram.

According to a typical configuration, a computing device for implementing the disclosed methods and apparatus may include one or more processors (CPUs), an input/output interface, a network port, and a memory. In some exemplary embodiments, the memory may include a non-transitory computer-readable storage medium including instructions, which when executed by the computer, perform the above-described methods. In some exemplary embodiments, the computer device may be a mobile device, such as a mobile phone or a watch.

The memory may include a volatile memory, a Random Access Memory (RAM), and/or a non-volatile memory (NVM), such as a Read Only Memory (ROM) or a flash RAM. The memory is an example of computer-readable media. Specific examples of computer-readable media may include, but are not limited to, Phase-Change Random Access Memory (PRAM), Static Random Access Memory (SRAM), Dynamic Random Access Memory (DRAM), and other types of RAM, Read-Only Memory (ROM), Electrically Erasable Programmable Read-Only Memory (EEPROM), flash memory, or other internal memory, Compact Disc Read-Only Memory (CD-ROM), Digital Versatile Disc (DVD), or other optical storage means, magnetic tape cassettes, magnetic tapes or magnetic discs, or other magnetic storage devices, or any other non-transmission media that can be used for storing information that can be accessed by computing devices. As defined herein, the computer-readable media do not include computer-readable transitory media, e.g., modulated data signals and signal carriers.

It should be noted that the relational terms herein such as "first" and "second" are used only to differentiate an entity or operation from another entity or operation, and do not require or imply any actual relationship or sequence between these entities or operations. Moreover, the words "comprising," "having," "containing," and "including," and other similar forms are intended to be equivalent in meaning and be open-ended, in that an item or items following any one of these words is not meant to be an exhaustive listing of such item or items, or meant to be limited to only the listed item or items.

Other embodiments of the invention will be apparent to those skilled in the art from consideration of the specification and practice of the invention disclosed herein. This application is intended to cover any variations, uses, or adaptations of the invention following the general principles thereof, and include such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes may be made without departing from the scope thereof. It is intended that the scope of the invention should only be limited by the appended claims.

What is claimed is:

1. A method for information recognition using an Optical Character Recognition (OCR) program comprising:
   acquiring an image of an object to be recognized;
   detecting a tilt angle associated with one or more character lines in the image and performing a tilt correction process to obtain a corrected image;
   analyzing a layout of contents of the corrected image and extracting character area blocks in the corrected image based on types of language in the character area blocks;
   marking and ranking the extracted character area blocks using one or more frames, wherein the extracted character area blocks are ranked and marked as a sequence of area blocks;
   determining key character lines in the character area blocks based on a keyword library, wherein character lines containing one or more keywords in the keyword library are determined as the key character lines;
   changing a determination of at least one of the key character lines to a regular character line in response to receiving a user input, the at least one of the key character lines containing at least one keyword in the keyword library; and
   recognizing, by the OCR program, character information of the determined key character lines in the character area blocks based on the sequence of area blocks, wherein character information not belonging to the key character lines in the sequence of area blocks is not recognized by the OCR program.

2. The method according to claim 1, further comprising presenting the extracted character area blocks, wherein determining key character lines in the character area blocks comprises determining the key character lines according to a detected first selection operation conducted by a user in the character area blocks.

3. The method according to claim 2, wherein determining the key character lines according to the detected first selection operation conducted by the user in the character area blocks comprises:
   when the first selection operation is a click operation, acquiring click positions corresponding to the click operation and using character lines corresponding to the click positions as the key character lines; or
   when the first selection operation is a frame selection operation, acquiring a frame selection area corresponding to the frame selection operation and using character lines in the frame selection area as the key character lines.

4. The method according to claim 1, further comprising calling a preset keyword library.

5. The method according to claim 4, further comprising:
detecting a second selection operation conducted by the user to confirm the determined character lines are correct key character lines; and
presenting the recognized key character lines.

6. The method according to claim 1, further comprising:
presenting character information of the recognized key character lines; and
when a correction operation conducted by the user to the presented character information is detected, recording corrected information as the character information of the key character lines.

7. The method according to claim 1, wherein the object to be recognized includes an invoice.

8. An information recognition apparatus comprising:
an acquisition unit configured to acquire an image of an object to be recognized;
an extraction unit configured to detect a tilt angle associated with one or more character lines in the image, to perform a tilt correction process to obtain a corrected image, to analyze a layout of contents of the corrected image, to extract character area blocks in the corrected image based on types of language in the character area blocks, and to mark and rank the extracted character area blocks using one or more frames, wherein the extracted character area blocks are ranked and marked as a sequence of area blocks;
a determination unit configured to determine character lines containing one or more keywords in the keyword library as the key character lines, and to change a determination of at least one of the key character lines to a regular character line in response to receiving a user input, the at least one of the key character lines containing at least one keyword in the keyword library; and
a recognition unit configured to use an Optical Character Recognition (OCR) to recognize character information of key character lines in the character area blocks based on the sequence of area blocks, wherein character information not belonging to the key character lines in the character area blocks is not recognized by the recognition unit.

9. The information recognition apparatus according to claim 8, further comprising:
a first presentation unit configured to present the extracted character area blocks; and
a first determination unit configured to determine the key character lines according to a detected first selection operation conducted by a user in the character area blocks.

10. The information recognition apparatus according to claim 9, wherein the first determination unit is further configured to:
when the first selection operation is a click operation, acquire click positions corresponding to the click operation and use character lines corresponding to the click positions as the key character lines; or
when the first selection operation is a frame selection operation, acquire a frame selection area corresponding to the frame selection operation and use character lines in the frame selection area as the key character lines.

11. The information recognition apparatus according to claim 8, further comprising:
a calling unit configured to call a preset keyword library.

12. The information recognition apparatus according to claim 11, further comprising:
a third determination unit configured to detect a second selection operation conducted by the user to confirm the determined character lines are correct key character lines; and
a second presentation unit configured to present the recognized key character lines.

13. The information recognition apparatus according to claim 8, further comprising:
a third presentation unit configured to present character information of the recognized key character lines; and
a correction unit configured to record corrected information as the character information of the key character lines when a correction operation conducted by the user to the presented character information is detected.

14. The information recognition apparatus according to claim 8, wherein the object to be recognized includes an invoice.

15. An information recognition apparatus comprising:
a memory storing instructions; and
a processor configured to execute the instructions to cause the information recognition apparatus to perform:
acquiring an image of an object to be recognized;
detecting a tilt angle associated with one or more character lines in the image and performing a tilt correction process to obtain a corrected image;
analyzing a layout of contents of the corrected image and extracting character area blocks in the corrected image based on types of language in the character area blocks;
marking and ranking the extracted character area blocks using one or more frames, wherein the extracted character area blocks are ranked and marked as a sequence of area blocks;
determining key character lines in the character area blocks based on a keyword library, wherein character lines containing one or more keywords in the keyword library are determined as the key character lines;
changing a determination of at least one of the key character lines to a regular character line in response to receiving a user input, the at least one of the key character lines containing at least one keyword in the keyword library; and
recognizing, by the OCR program, character information of the determined key character lines in the character area blocks based on the sequence of area blocks, wherein character information not belonging to the key character lines in the character area blocks is not recognized by the OCR program.

16. The information recognition apparatus according to claim 15, wherein the processor is configured to execute the instructions to cause the information recognition apparatus to further perform:
presenting the extracted character area blocks; and
determining the key character lines according to a detected first selection operation conducted by a user in the character area blocks.

17. The information recognition apparatus according to claim 16, wherein the processor is configured to execute the instructions to cause the information recognition apparatus to further perform:

when the first selection operation is a click operation, acquiring click positions corresponding to the click operation and using character lines corresponding to the click positions as the key character lines; or when the first selection operation is a frame selection operation, acquiring a frame selection area corresponding to the frame selection operation and using character lines in the frame selection area as the key character lines.

18. The information recognition apparatus according to claim 15, wherein the processor is configured to execute the instructions to cause the information recognition apparatus to further perform:

detecting a second selection operation conducted by the user to confirm the determined character lines are correct key character lines; and presenting the recognized key character lines.

19. The information recognition apparatus according to claim 15, wherein the processor is configured to execute the instructions to cause the information recognition apparatus to further perform:

presenting character information of the recognized key character lines; and when a correction operation conducted by the user to the presented character information is detected, recording corrected information as the character information of the key character lines.

20. The information recognition apparatus according to claim 15, wherein the object to be recognized includes an invoice.

21. A non-transitory computer readable medium that stores a set of instructions that is executable by at least one processor of a device to cause the device to perform a method for information recognition using an Optical Character Recognition (OCR) program, the method comprising:

acquiring an image of an object to be recognized;

detecting a tilt angle associated with one or more character lines in the image and performing a tilt correction process to obtain a corrected image;

analyzing a layout of contents of the corrected image and extracting character area blocks in the corrected image based on types of language in the character area blocks;

marking and ranking the extracted character area blocks using one or more frames, wherein the extracted character area blocks are ranked and marked as a sequence of area blocks;

determining key character lines in the character area blocks based on a keyword library, wherein character lines containing one or more keywords in the keyword library are determined as the key character lines;

changing a determination of at least one of the key character lines to a regular character line in response to receiving a first user input, the at least one of the key character lines containing at least one keyword in the keyword library; and recognizing, by the OCR program, character information of the determined key character lines in the character area blocks based on the sequence of area blocks, wherein character information not belonging to the key character lines in the character area blocks is not recognized by the OCR program.

22. The non-transitory computer readable medium according to claim 21, wherein the set of instructions that is executable by the at least one processor of the device to cause the device to further perform:

presenting the extracted character area blocks, wherein determining key character lines in the character area blocks comprises determining the key character lines according to a detected first selection operation conducted by a user in the character area blocks.

23. The non-transitory computer readable medium according to claim 22, wherein the set of instructions that is executable by the at least one processor of the device to cause the device to further perform:

when the first selection operation is a click operation, acquiring click positions corresponding to the click operation and using character lines corresponding to the click positions as the key character lines; or when the first selection operation is a frame selection operation, acquiring a frame selection area corresponding to the frame selection operation and using character lines in the frame selection area as the key character lines.

24. The non-transitory computer readable medium according to claim 21, wherein the set of instructions that is executable by the at least one processor of the device to cause the device to further perform:

calling a preset keyword library.

25. The non-transitory computer readable medium according to claim 24, wherein the set of instructions that is executable by the at least one processor of the device to cause the device to further perform:

detecting a second selection operation conducted by the user to confirm the determined character lines are correct key character lines; and presenting the recognized key character lines.

26. The non-transitory computer readable medium according to claim 21, wherein the set of instructions that is executable by the at least one processor of the device to cause the device to further perform:

presenting character information of the recognized key character lines; and when a correction operation conducted by the user to the presented character information is detected, recording corrected information as the character information of the key character lines.

27. The non-transitory computer readable medium according to claim 21, wherein the object to be recognized includes an invoice.

* * * * *

UNITED STATES PATENT AND TRADEMARK OFFICE
CERTIFICATE OF CORRECTION

| | |
|---|---|
| PATENT NO. | : 10,346,703 B2 |
| APPLICATION NO. | : 14/931575 |
| DATED | : July 9, 2019 |
| INVENTOR(S) | : Yu Zhang |

It is certified that error appears in the above-identified patent and that said Letters Patent is hereby corrected as shown below:

On the Title Page

Item (30), "2014 1 0638602" should read as --201410638602.X--

Signed and Sealed this
Fifth Day of July, 2022

Katherine Kelly Vidal
*Director of the United States Patent and Trademark Office*